United States Patent [19]

Schmidt et al.

[11] Patent Number: 4,791,282

[45] Date of Patent: Dec. 13, 1988

[54] SYSTEM FOR AUTOMATICALLY CHARGING AND DISCHARGING X-RAY FILM SHEETS INTO AND FROM CASSETTES AND A CASSETTE FOR USE IN THE SYSTEM

[75] Inventors: Manfred Schmidt, Kirchheim; Herbert Gebele, Sauerlach, both of Fed. Rep. of Germany

[73] Assignee: AGFA- GEVAERT AG, Leverkusen, Fed. Rep. of Germany

[21] Appl. No.: 906,916

[22] Filed: Sep. 11, 1986

[30] Foreign Application Priority Data

Sep. 24, 1985 [DE] Fed. Rep. of Germany ....... 3533954

[51] Int. Cl.⁴ .............................................. G06K 7/10
[52] U.S. Cl. .................................... 235/462; 235/475; 235/479; 235/482; 235/484; 235/485; 378/181; 378/182
[58] Field of Search ................. 378/181, 182; 235/462, 235/463, 475, 477, 479, 482, 483, 485, 486, 487, 495

[56] References Cited

U.S. PATENT DOCUMENTS

| | | | |
|---|---|---|---|
| 3,629,556 | 12/1971 | Orzectowski et al. | 235/485 |
| 3,857,020 | 12/1974 | Higginbotham et al. | 235/462 |
| 4,193,540 | 3/1980 | Dougadous et al. | 235/454 |
| 4,249,819 | 2/1981 | Boser et al. | 378/182 |
| 4,454,939 | 6/1984 | Kamp et al. | 250/328 |
| 4,493,107 | 1/1985 | Stockburger et al. | 235/485 |
| 4,501,959 | 2/1985 | Stockburger et al. | 235/485 |

Primary Examiner—A. D. Pellinen
Assistant Examiner—Jeffrey A. Gaffin
Attorney, Agent, or Firm—Michael J. Striker

[57] ABSTRACT

An X-ray film cassette has on its top a triangular bar code field readable by a bar code reader of an automatic film sheet charging and discharging apparatus. The bar code field is in the form of an isosceles right triangle whose hypothenuse faces a reference corner and whose legs extend parallel to edges of the cassettes. The bars of the code extend parallel to the hypothenuse. An optical axis of the bar code reader, when the cassette is in its end position in the apparatus, intersects a vertex area formed by the legs of the triangle. This arrangement guarantees that its bar codes on cassettes of small format, even if misaligned in the feeding direction, are reliably read by the reader.

8 Claims, 1 Drawing Sheet

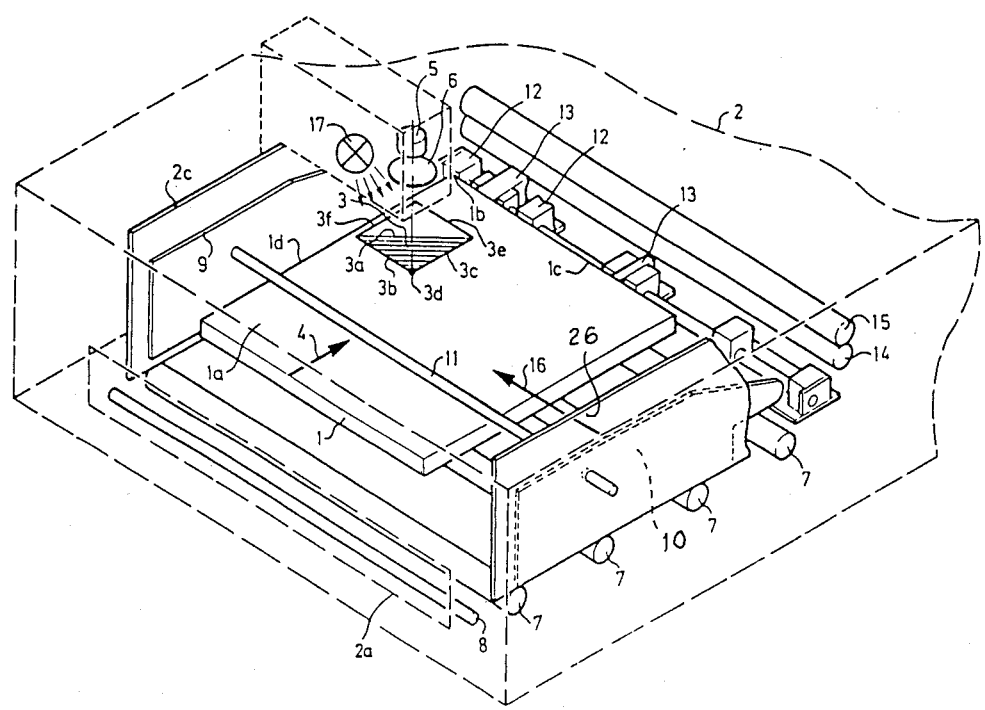

SYSTEM FOR AUTOMATICALLY CHARGING AND DISCHARGING X-RAY FILM SHEETS INTO AND FROM CASSETTES AND A CASSETTE FOR USE IN THE SYSTEM

BACKGROUND OF THE INVENTION

The present invention relates to an automaticaly operating apparatus for charging and/or discharging X-ray film sheets into cassettes of different formats and relates also to a cassette for use in the apparatus. The cassette is of a flat rectangular configuration and has on one of its major surfaces a bar code containing information about the cassette and film sheet format.

A charging and discharging apparatus of this kind is known for example from the German Patent No. 3,232,148. The disadvantage of this known apparatus is the relatively complex determination of the format of a cassette to be processed and of the selection of the corresponding size of the new film sheets to be inserted into the cassette. From the European patent application No. 00 79 557 it is known to provide recording foils or X-ray films with bar codes or magnetic codes located in the range of an openable window in the cassette so as to enable an automatic reading of information concerning the recording foil. In addition, from the German Patent No. 3,147,956 it is also known to apply an erasable bar code or magnetic code or electrostatic code on the cover an X-ray film cassette so as to enable the control of intended multiple exposure. However, if such prior art codes are used for indicating the format of cassettes or film sheets to be automatically processed in a film sheet charging and discharging apparatus, then a difficulty is encountered when the cassettes of different formats are fed into the apparatus. Large format cassettes whose size matches that of the intake compartment of the apparatus are advanced past a code trailer substantially parallel to the designed feeding direction and the code reader reads the coded information on the cassette without any difficulties. However, the smaller is the cassette, the greater is the possibility that for some reason or other the cassette during transportation takes an oblique position relative to the direction. Consequently, there is the probability that the code reader senses only a part of the code during the transportation of the cassette and delivers incorrect data for the automatic selection of a new film sheet to be inserted into the cassette.

SUMMARY OF THE INVENTION

It is, therefore a general object of this invention to overcome the aforementioned disadvantages.

More particularly, it is an object of this invention to provide an improved system of the aforedescribed kind in which the code on cassettes of different formats can be reliably detected by a code reader even if a cassette of smaller format accidentally becomes misaligned with the feeding direction.

In keeping with these objects and others which will become apparent hereafter, one feature of this invention resides, in an automatic X-ray film sheet charging and discharging system in the provision of an automatically operating apparatus for charging and/or discharging an X-ray film sheet into and/or from a cassette, the apparatus including a cassette intake compartment provided with a guiding wall and with means for stopping a cassette in a fixed end position, an electrooptical bar code reader arranged above the intake compartment, an X-ray film cassette of a flat rectangular configuration defining a flat top wall having a guiding edge engageable with the guiding wall and a leading edge engageable with the stopping means, the top wall being provided with a triangular field in the form of an isosceles right triangle whose legs extend parallel to the guiding and leading edges, the triangular field enclosing a bar code readable by the bar code reader, and the bars of the bar code extending parallel to the hypotenuse of the triangle.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates schematically in a perspective view essential parts of the system of this invention including an automatic film sheet charging and discharging apparatus and an X-ray film cassette shown in its end position in the apparatus and being provided with a novel bar code arrangement.

DESCRIPTION OF THE PREFERRED EMBODIMENT

In the drawing, an X-ray film cassette is designated by reference numeral 1. The cassette is of a medium format and is illustrated only schematically. The cassette is of a conventional design and consists of a bottom part and of a cover part inclusive of locking means for the cover part. The locking means are designed such that an automatically operating film charging and discharging apparatus 2 can automatically open the cover part when the cassette reaches the illustrated end position. The apparatus 2 can process cassettes of different formats. In operation the apparatus automatically removes an exposed X-ray film from the cassette and upon determining the size of the cassette and of the contained film sheet, automatically selectsa new film sheet of corresponding format and inserts the same into the cassette whereupon the part is automatically closed and the cassette is discharged from the apparatus. In order to simplify and improve the reading of coded information on cassettes of different formats, a top surface of a major wall of the cassette, preferably the top wall 1a of the inserted cassette is provided with a bar code 3 containing information about the format of the cassette and of the inserted film sheet. In the case that several kinds of film are available for the cassette of a certain format, such as for example for normal and mammografic exposures, the bar code 3 also contains additional information about the quality of film to be inserted. The bar code 3 on all cassettes of any format usable in the system has the same position relative to a reference corner 1b which is brought into engagement with a corresponding corner in an intake compartment of the apparatus 2. In the shown example, the reference corner is the leading left hand corner when viewed in the cassette feeding direction 4. Accordingly, the bar codes 3 for different cassettes 1 have a uniform size and are uniformly spaced from a leading edge 1c and from a lateral guiding edge 1b of the cassette. The leading and guiding edges 1c and 1d form together the reference corner 1b.

In conventional bar coded cassettes where the bars of the code extend parallel to a cassette edge it frequently happens that when inserting cassettes of smaller format into the entrance opening 2a of a cassette intake compartment, the cassette may be tilted relative to the feeding direction 4 and only after reaching the stopping devices 12 at the end of the intake compartment the position of the cassette is corrected so that its reference corner 1b coincides with a corresponding corner of the compartment. In this case it may happen that a portion of the bar code does not pass below the stationary bar code reader and consequently the reading is incorrect and causes an incorrect control of the automatic charging and discharging apparatus 2.

In order to avoid any possibility of misalignment of the bar code with the code reader, the bar code 3 of this invention is arranged in a triangular field having the form of an isosceles right triangle whereby the bars of the code extend parallel to the hypotenuse 3a and the equal legs 3b and 3c of the triangular field extend parallel to opposite leading and guiding edges 1c and 1b of the cassette. As mentioned before, the bar code 3 on all cassettes of different formats is arranged at a predetermined uniform location relative to the reference corner 1b and preferably is arranged in the quadrant of the top wall 1a which pertains to the reference corner. The triangular field 3a through 3c enclosing the bar code 3 is oriented such that the hypothenuse 3a of the field faces the reference corner 1b whereas the vertex point 3d opposite the hypothenuse is directed to the diametrically opposed corner of the cassette. In practice, the triangular bar code field is formed on a rectangular label whose sides 3b, 3c, 3e and 3f extend parallel to corresponding guiding and leading edges 1d and 1c of the cassette. The hypothenuse 3a of the triangular field forms a diagonal of the label and of course the half of the label which is opposite the reference corner remains blank. In a modification the label may have also a configuration of a parallelogram whereby the hypothenuse forms a side of the parallelogram or the hypothenuse may form a side of the rectangular label. In either case, however, the orientation of the triangular field 3a through 3c relative to the reference corner 1b is the same as illustrated.

In this example, a stationary bar code reader 5, 6 is fixedly arranged at such a location in the apparatus 2 at which its optical axis intersects the vertex region 3d of the bar code 3 when the cassette is located in its end position in abutment with the stop devices 12. By virtue of this arrangement no matter how misaligned is a cassette 1 of smaller format with the feeding direction 4, the bar code reader 5, 6 always reads each and every bar of the code during the advance of the cassette into its end position. Consequently, any error which frequently occurred during the advance of misaligned cassettes of smaller format is now effectively eliminated. For example when a cassette is advanced towards the stopping devices 12 along its guiding edge 1b then the bar code reader 5, 6 reads all bars along the leg 3c. If a small format cassette is inserted and advanced in a wrong position in which the bar code misses the optical axis of the reader, then, as it will be described below, upon abutment against stopping devices 12 the cassette is shifted laterally and the bar code reader reads all bars along the leg 3b. However, these two reading possibilities occur under limit positions at which a cassette may be advanced against the stopping means. Consequently all intermediate positions taken by a cassette during its transportation path guarantee a reliable reading of all code bars by the reader. A bar code reader of conventional design is capable to distinguish relatively minute spacings between individual bars even if the cassette is moved along a curved path. The novel arrangement of the bar code field thus enables reliable detection of coded information at random movements of the advancing cassette and insures a correct charging of a new film sheet into the cassette.

The automatic film sheet charging and discharging apparatus 2 is of conventional design and therefore the parts which are not essential for understanding this invention have been omitted for the sake of clarity. The housing of the apparatus is indicated by dashed lines. The non-illustrated devices cooperate with the stopping means 12 and automatically remove a film sheet from the cassette 1 as soon as the latter has reached its illustrated end position and feed the film into a developing device whereupon a new X-ray film sheet collected from storing means in accordance with information read by the bar code reader is charged the cassette. The housing has an entrance opening 2a dimensioned for receiving X-ray film cassette 1. The entrance opening automatically closes itself against ambient light when no cassette is present in its perimeter. The cassette intake compartment communicates with the entrance opening 2a and is delimited by lateral walls 2b and 2c and by stopping means 12. The feeding of a cassette 1 into the intake compartment is made in conventional manner by transporting rollers 7. A switching roller 8 arranged along the entrance opening 2a is activated by the inserted cassette and turns on a non-illustrated drive for the transporting roller 7. When the leading edge 1c of the cassette engages the stopping devices 12, a non-illustrated limit switch turns the drive off. The guiding walls 2b and 2c support a guiding rod 11 extending at right angles to the feeding direction 4 and supporting sliding partitions 9 and 10 adjustable in position in the direction of arrow 16. Stopping means 12 contain conventional devices for stopping the cassette in the illustrated end position and further include devices 13 for opening the cassette and for activating transporting rollers 14 and 15 which discharge a film sheet from the open cassette and charge the latter with a new film sheet of the selected format and kind. In a modified version of the apparatus 2, the cassette is stepwise moved from the illustrated end position in the intake compartment into successive working stations performing the opening, th film discharging and film charging functions.

When a small format cassette 1 is advanced in the feeding direction 4 into engagement against the stopping means 12 a non-illustrated drive starts moving the sliding portion in the direction of arrow 16 against the opposite sliding partition 9 which abuts against the guiding wall 2c. As described before, until the reference corner 1b reaches the corresponding corner of the intake compartment, the reader 5, 6 reads the bar code along the leg 3b. In this manner it is guaranteed that when the smallest cassettes which may be irregularly advanced through the intake compartment moves its triangular bar code field past the optical axis of the reader. Reference numeral 6 indicates an optical part of the reader whereas reference numeral 5 indicates the sensing part. The optical axis of optical part 6 is directed perpendicularly to the vertex 3d of the triangular bar code. An illumination device 17 is arranged at a side of the reader 5, 6 and emits light for illuminating the bar code 3. The film sheet to be exchanged is insensitive to the emitted light. The illumination device 17 together with the bar code reader 5, 6 and the transporting rollers 7 are activated simultaneously by the switching roller 8. A non-illustrated controlling device decodes the sensed information and controls the selection of the format of a new film sheet and its charging into the cassette. The before described limit switch arranged in the stopping means 12 also deactivates the devices 5, 6 and 17 when the cassette reaches its illustrated end position.

The same triangular bar code field 3 on the cassette is also applicable in the embodiment of the charging and discharging apparatus 2 which centers the inserted cassette along a central line of the intake compartment extending parallel to the feeding direction 4. In this case the triangular bar code field on cassettes of all applicable formats is located at a uniform distance from the leading edge and from the center line of the cassette.

While the invention has been illustrated and described as embodied in specific examples of the cassette charging and discharging system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An X-ray film cassette of a flat rectangular configuration for use in an automatic film sheet charging and discharging apparatus of the type having an intake compartment provided with transporting means for advancing the cassette in a feeding direction along a guiding means into engagement with stopping means, and a stationary bar code reader located above the intake compartment, the cassette comprising on its top wall a triangular bar code field in the form of an isosceles right triangular whose legs extend parallel to edges of said cassette, said field enclosing a bar code readable by a bar code reader and the bars of the code extending parallel to the hypothenuse of said triangle; said cassette having a leading edge and a lateral guiding edge forming together a reference corner; a bar code reader being located above a quadrant of said top wall pertaining to said reference corner, said hypothenuse facing said reference corner, and the vertex of said triangle opposite said hypothenuse being directed to a diametrically opposed cassette corner so that said bar code makes possible its reading by a stationary bar code reader in two mutually perpendicular directions.

2. A cassette as defined in claim 1, wherein said triangular bar code field on cassettes of different formats is located at a uniform distance from said leading and guiding edges.

3. A cassette as defined in claim 1, wherein said triangular bar code field is formed on a rectangular label applied on said cassette.

4. A system for charging and/or discharging X-ray film sheets into and/or from cassettes of different formats, comprising an automatically operating apparatus for charging and discharging an X-ray film into and/or from a cassette, the apparatus including a cassette intake compartment provided with an entrance opening for a cassette, a guiding wall extending in the feeding direction of the cassette, means for stopping the movement of the cassette in the feeding direction, and means for shifting the cassette against said guiding wall into a fixed end position; an electrooptical bar code reader fixedly arranged above said intake compartment; an X-ray film cassette of a flat rectangular configuration including a flat top wall having a lateral guiding edge engageable with said guiding wall, an opposite lateral edge engageable with said shifting means, and a leading edge engageable with said stopping means; said top wall being provided with a triangular field in the form of an isosceles right triangle whose legs extend parallel to the edges of said cassette and whose hypothenuse faces a corner area between said guiding and leading edges, said triangular field enclosing a bar code readable by said bar code reader, the bars of said bar code extending parallel to said hypothenuse; and said bar code reader being arranged in said apparatus in such a position that when said cassette is in said fixed end position an optical axis of said bar code reader passes through a vertex area formed by the legs of said triangular bar code field so that said bar code makes possible its reading by said bar code reader in two mutually perpendicular directions.

5. A system as defined in claim 4, further comprising an illuminating device arranged at a side of said bar code reader for illuminating said triangular bar code field on said cassette.

6. A system as defined in claim 5, wherein said illuminating device emits light at a wavelength to which the film sheets processed by the apparatus are insensitive.

7. A system as defined in claim 5, further comprising means for activating said illuminating device when a cassette is introduced into said intake compartment, and means for deactivating said illuminating device when said cassette engages said stopping means.

8. A system as defined in claim 4, further comprising transporting means arranged in said intake compartment for advancing the inserted cassette in said feeding direction, and said stopping means further including devices for initiating the processing operation of said apparatus in accordance with information delivered by said bar code reader.

* * * * *